United States Patent
Van Rooij et al.

(10) Patent No.: US 9,765,859 B2
(45) Date of Patent: Sep. 19, 2017

(54) SERIAL CONTINUOUSLY VARIABLE TRANSMISSION

(71) Applicant: GEAR CHAIN INDUSTRIAL B.V., Eindhoven (NL)

(72) Inventors: Jacobus Hubertus Maria Van Rooij, Nuenen (NL); Loek Marquenie, Eindhoven (NL)

(73) Assignee: Gear Chain Industrial B.V., Eindhoven (NL)

( * ) Notice: Subject to any disclaimer, the term of this patent is extended or adjusted under 35 U.S.C. 154(b) by 154 days.

(21) Appl. No.: 14/784,140

(22) PCT Filed: Apr. 14, 2014

(86) PCT No.: PCT/NL2014/000014
§ 371 (c)(1),
(2) Date: Oct. 13, 2015

(87) PCT Pub. No.: WO2014/171816
PCT Pub. Date: Oct. 23, 2014

(65) Prior Publication Data
US 2016/0053872 A1    Feb. 25, 2016

(30) Foreign Application Priority Data
Apr. 15, 2013  (NL) ..................................... 1040165

(51) Int. Cl.
*F16H 9/18*  (2006.01)
*F16H 9/16*  (2006.01)

(52) U.S. Cl.
CPC ......... *F16H 9/18* (2013.01); *F16H 2009/166* (2013.01)

(58) Field of Classification Search
CPC ............................. F16H 2009/166; F16H 9/18
See application file for complete search history.

(56) References Cited

U.S. PATENT DOCUMENTS

| 1,236,749 A | * | 8/1917 | Osser ....................... F16H 9/18 476/17 |
| 2,531,992 A | | 11/1950 | Schlaepfer |

(Continued)

FOREIGN PATENT DOCUMENTS

| FR | 2057599 A5 | 5/1971 |
| GB | 2092685 A | 8/1982 |
| WO | 2005032873 A2 | 4/2005 |

OTHER PUBLICATIONS

International Search Report in Related PCT Application No. PCT/NL2014/000014, mailed Jul. 1, 2014.

*Primary Examiner* — William E Dondero
*Assistant Examiner* — Robert T Reese
(74) *Attorney, Agent, or Firm* — Troutman Sanders LLP; Ryan A. Schneider

(57) ABSTRACT

The invention provides a serial continuously variable transmission (1) comprising an input shaft (8) with a first pulley sheave set (10) of a first CVT stage and an output shaft (18) with a fourth pulley sheave set (20) of a second CVT stage, and a second (14) and third (16) pulley sheave set, rotating around a common axis and mutually rotationally secured the respective inner pulley sheave of the second and the third pulley sheave set being interconnected and combined into an assembly which is shiftable along and rotatable therearound the common axis (12), while the respective diameters of the pulley sheaves of the second CVT stage are greater than the diameters of the sheaves of the first CVT stage, in such a way that the effective running radius of the driving belt of this second stage will be greater than the effective running radius of the driving belt of the first stage.

14 Claims, 8 Drawing Sheets

(56) References Cited

U.S. PATENT DOCUMENTS

Figure 1:
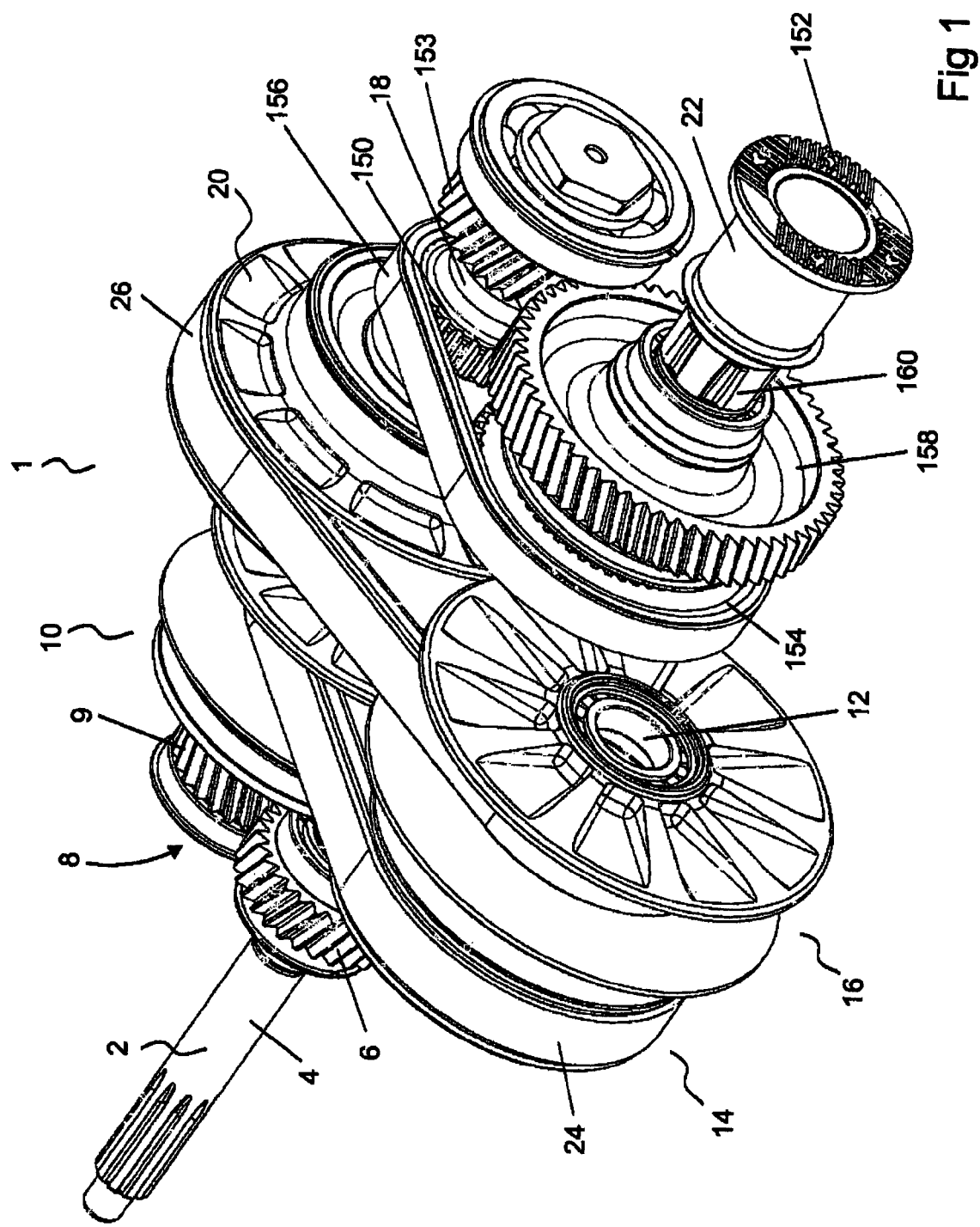

| | | | |
|---|---|---|---|
| 3,044,316 A | 7/1962 | Forster | |
| 2006/0154760 A1 | 7/2006 | Brown | |
| 2008/0272596 A1* | 11/2008 | House | F16H 9/18 290/44 |
| 2013/0316862 A1* | 11/2013 | Brandon | F16H 9/04 474/69 |
| 2015/0342119 A1* | 12/2015 | Duquesne | A01F 12/38 700/280 |

* cited by examiner

SERIAL CONTINUOUSLY VARIABLE TRANSMISSION

CROSS-REFERNCE TO RELATED APPLICATIONS

This application is a US National Stage of International Application No. PCT/NL2014/000014 filed 14 Apr. 2014, which claims the benefit of NL 1040165 filed 15 Apr. 2013, each herein fully incorporated by reference.

The invention relates to a serial continuously variable transmission comprising a housing which contains:

an input shaft which carries rotationally secured thereto a first controllable pulley sheave set, an output shaft carrying rotationally secured thereto a fourth controllable pulley sheave set, and at a distance thereof a second and third pulley sheave set, rotating around a common axis and mutually rotationally secured, a first transmission chain around the first and second pulley sheave set, a second transmission chain around the third and fourth pulley sheave set, these chains each comprising a number of adjacent links intercoupled by pairs of rocker elements in which in each pair the ends of at least one rocker element can cooperate in a torque transmitting way with the pulley sheaves in which the respective outer pulley sheaves of the second and third pulley sheave set are axially fixed and the respective inner pulley sheave of the second and the third pulley sheave set are interconnected and combined into an assembly which is shiftable along and rotatable therearound the common axis.

Such a transmission which comprises, in fact, two CVT stages in series, namely a first stage with the first and the second pulley sheave sets and a second stage with the third and the fourth pulley sheave sets is described in the U.S. Pat. No. 7,217,205.

Said transmission chains can be of the kind such as known from U.S. Pat. No. 5,728,021 and EP 0741255, both in the name of Applicant. Such transmission chains offer a much higher power density and much lower friction losses as the older endless V-belts made from rubber or another comparable material. However, due to the high power density and lower traction coefficient between the steel chain and the pulley sheaves, significant higher clamping forces are required which in addition need to be controlled precisely: a too high pressure leads to fretting of the pulley surface and a too low pressure leads to slipping of the ends of the torque transmitting elements over the pulley surfaces. In both cases there is a real risk of damaging these elements and the pulley surfaces while the efficiency of the transmission is reduced. The usual mechanisms as used in CVT's with rubber V-belts for generating the clamping forces, consisting of one or more coil springs, cannot generate sufficient forces to meet the demands of a CVT with a steel chain; therefore hydraulic clamping systems are used in chain CVT's which also allows for a compact overall design of such a CVT.

The above-mentioned serial continuously variable transmissions offer, when compared with the known single-stage continuously variable transmission a number of advantages which are extensively described in the above-mentioned state of the art and which will not be enumerated anew.

An important element of such a transmission is the assembly which comprises the combination of the second and the third pulley sheave set. This assembly comprises on the one hand the fixed, thus axially immovable, outer pulley sheaves of the second and the third pulley sheave set and on the other hand the axially, as an entity movable, inner pulley sheaves of the second and the third set of pulley sheaves.

In the U.S. Pat. No. 7,217,205 this schematically shown entity is indicated as "idler pulley wheel" (122) and this patent specification states that this idler pulley wheel can move freely along the shaft (116) thereof in response to the momentary axial position of the, axially movable, pulley sheaves of the first and the fourth pulley sheave set respectively.

The second and the third pulley sheave sets which in combination constitute said assembly have, contrary to the first and the fourth pulley sheave sets, no specific means to control the position thereof. This position is only determined by the tension stresses in the first and second transmission chain and by the momentary position of the movable pulley sheaves of the first pulley sheave set and the fourth pulley sheave set.

When the transmission ratio of the first CVT stage, which comprises the first and the second pulley sheave sets, is such that the speed of the input shaft will be reduced, the torque exerted on the second pulley sheave set of this first stage which rotates with a lower speed will be greater than the torque as introduced on the input shaft. This means that the torque, exerted on the second CVT stage of the transmission, comprising the third and fourth pulley sheave sets, will also be greater than the torque as originally introduced. When operating in this way the driving chain of the second stage will have to transmit a greater torque than the driving chain of the first stage. Thus the clamping forces which must be exerted on the torque transmitting elements of the second driving chain must be greater than the clamping forces which have to be exerted on the corresponding elements of the first transmission belt.

However: an independent setting of these clamping forces is not possible which means in practice that the clamping force is set in correspondence of the higher value demanded by the second driving belt, so that the first driving chain is subjected to unnecessary great clamping forces which result in unnecessary losses and a lower efficiency of the transmission as a whole.

The invention aims to obviate this disadvantage and to this end proposes that the respective diameters of the pulley sheaves of the third and fourth set of pulley sheaves are greater than the diameters of the sheaves of the first and the second pulley sheave set respectively, in such a way that independent of the position of the shiftable assembly the effective running radius of the transmission chain which goes around the third and fourth sheaves can be greater than the effective running radius of the transmission chain which goes around the respective diagonally opposite sheaves of the first and second set respectively.

An increase of the running radius results in a decrease of the clamping forces to be exerted on the elements of the driving chain and in this way the disadvantages mentioned above are obviated.

Preferably the diameter of the sheaves of the third and the fourth set are chosen to be 30-60% greater than same of the sheave of the first and the second set.

When one wants that the respective ratio ranges of the stages are mutually different one can use the measure of claim 3.

The structure and the support of the assembly which comprises the second and the third pulley sheave sets must meet high demands.

As a result of the great tension forces which occur in the transmission chains the bearings of the displaceable pulley sheaves are heavily and one-sidedly loaded, namely in a direction perpendicular to the axis of the third and second pulley sheaves, while it must, however, be ensured that the unit with the inner sheaves of the second and the third pulley sheave set can move easily in axial direction to adapt itself without any delay to the position of the pulley sheaves of the first and the fourth set so that the transmission ratio of the transmission as a whole can change quickly. The assembly must thus be light with a low inertia and yet be able to withstand the occurring high forces.

Furthermore the assembly must have a simple structure so that the fabrication costs of the transmission will be limited.

This is realised according to the invention with a structure such as described in claim 4.

More preferably one will use the measures as described in the claims 5-7.

A preferred embodiment of the input shaft and of the torque transmitting bearing of the axially displaceable pulley sheave supported thereby is described in claim 8 while further details thereof are subject of the claims of 9, 10 and 11. The result of these measures is a light and yet strong structure which makes possible a fast response of the displaceable pulley sheaves on changes in the control pressure thereof.

The fact that the diameters of the pulley sheaves of the second CVT stage are greater than same of the pulley sheaves of the first CVT stage has as result that the end bearings of the input shaft and the output shaft respectively, which lie centrally in the transmission, are not in alignment (as in the case in the prior art), but next to each other. Preferably they are supported in a central support in the housing. This results in a compact and stiff structure.

When using the CVT as a vehicle transmission in combination with an engine which is placed in the longitudinal direction of the vehicle and the final wheel drive it is in some cases seen as disadvantage that the housing of the transmission is not symmetrical to the input shaft thereof; the housing lies eccentrically with respect to this shaft. When using the transmission in a vehicle with a separate chassis, such as in a lorry with longitudinal beams the problem arises that the mounting space between these beams is in most cases restricted. The invention obviates this problem by proposing that the input transmission shaft is driven by means of a separate gear wheel from the centrally located output shaft of the engine or the clutch which is also provided with a gear wheel. This has in addition the advantage that the ratio between the speed of the input shaft of the transmission on the one hand and the output shaft of the engine on the other hand can be chosen—within limits—at will, by means of which also the ratio between the torque as delivered by the engine and the torque to be transmitted by the transmission can be set. The tension in the driving belts will then be adapted to the value of this torque.

It is observed that US 2006/0154760 A1 describes a serial CVT of the kind as defined in the main claim in which the assembly comprising the second and third pulleys is made in one solid piece—this with the drawbacks as noted hereinbefore. All pulley sheaves have the same diameter.

U.S. Pat. No. 2,531,992 shows a compact Variator set-up comprising a centrally placed driving motor enclosed by two CVT stages, the $2^{nd}$ pulleyset, belonging to the first stage being rotationally secured, being rotationally secured, via a common shaft, to the $3^{rd}$ pulleyset belonging to the second stage.

The clamping forces for the two driving belts are not adjustable and generated by a single helical compressive spring, placed in-between and acting on the adjustable pulleys of the $2^{nd}$ and $3^{rd}$ sets in the axial direction. This document mentions the fact that the diameter of the sheaves may be mutually different for changing the output speed over a wide range (vide col. 2 I. 8-14 and col. 3 I.39-45). However, as there is no passive idler assembly as in the present invention and the driving belts are rubber V-belts which require only relatively small axial clamping forces in comparison with the clamping forces needed for steel chains, the problems for which the invention provides a solution do not even arise here. Thus the invention cannot be derived from this publication.

FR 2 057 599 describes a serial CVT in which the diameters of all pulley sheaves have the same value which may, however, vary-vide page 1 Lne 26-27.

U.S. Pat. No. 3,044,316 shows an automobile transmission which is a combination of a serial CVT in which all sheaves have the same diameter with a planetary gear to provide reverse drive. The $2^{nd}$ and $3^{rd}$ CVT pulleys are separate structural entities GB 2.092 685 shows a serial CVT in which all pulleys have the same diameter and in which the entity which comprises the movable pulley surfaces of the $2^{nd}$ and $3^{rd}$ set is made in one solid piece of material, not the open and lightweight structure as proposed by the invention.

Figure 2:
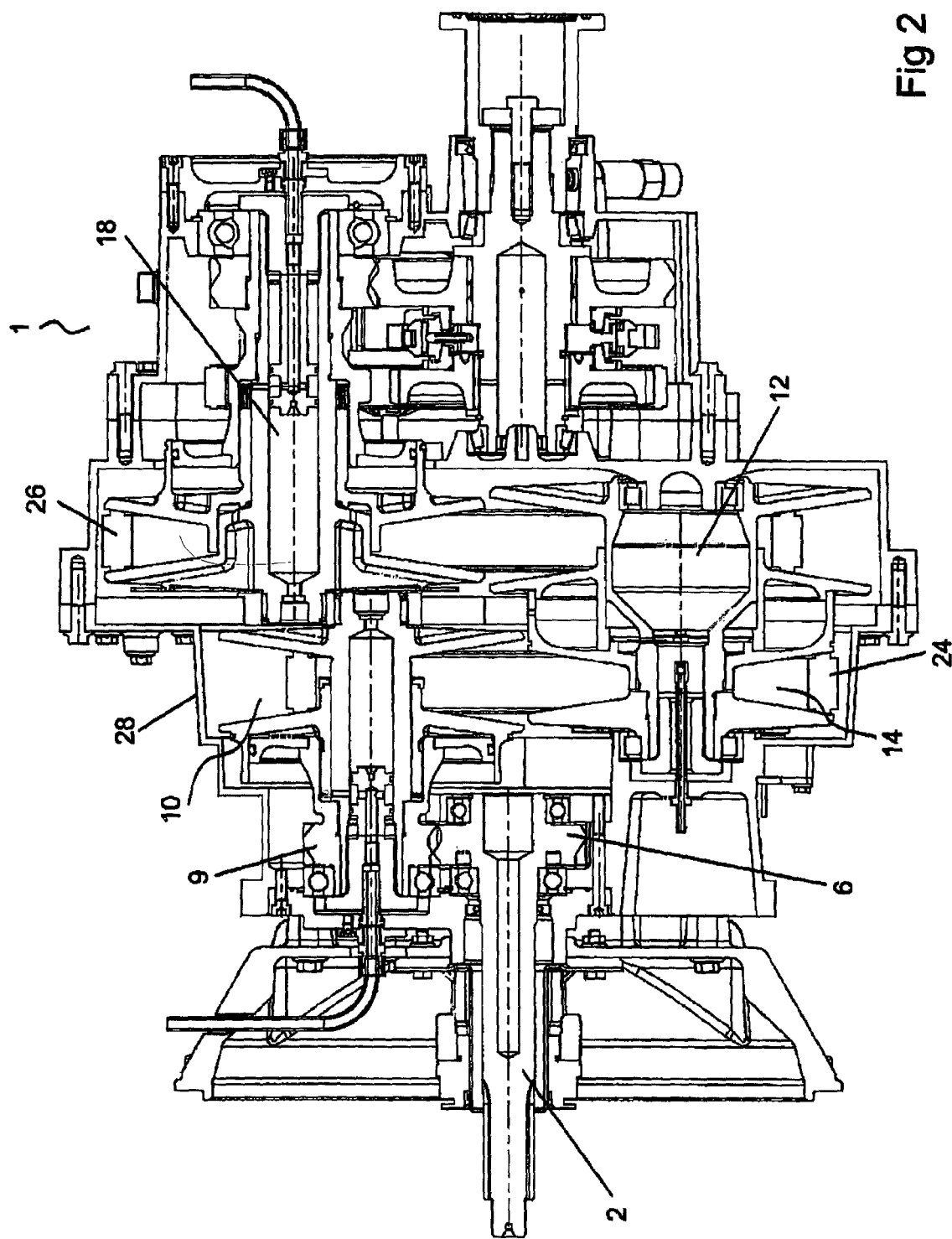
Figure 3A:
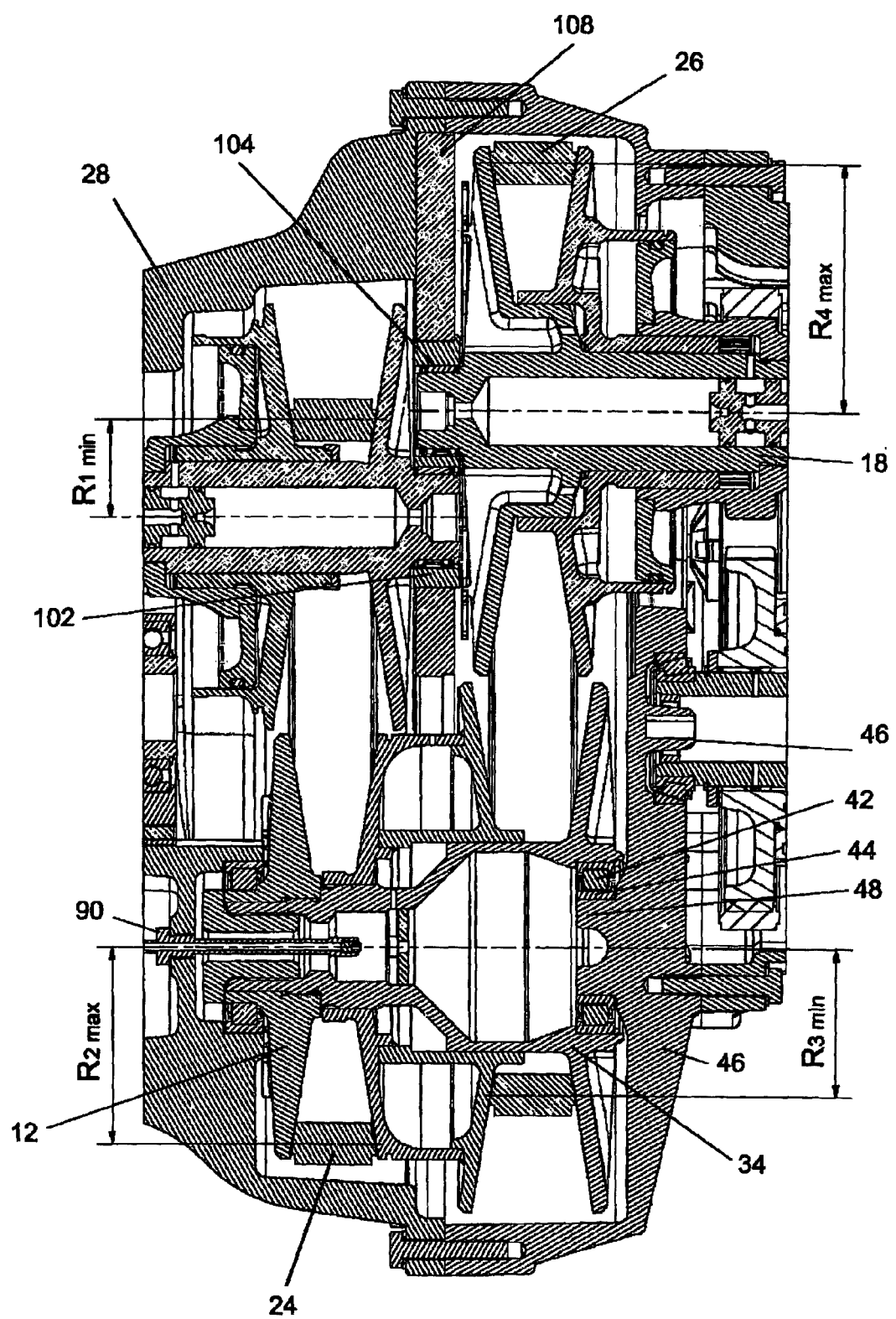
Figure 3B:
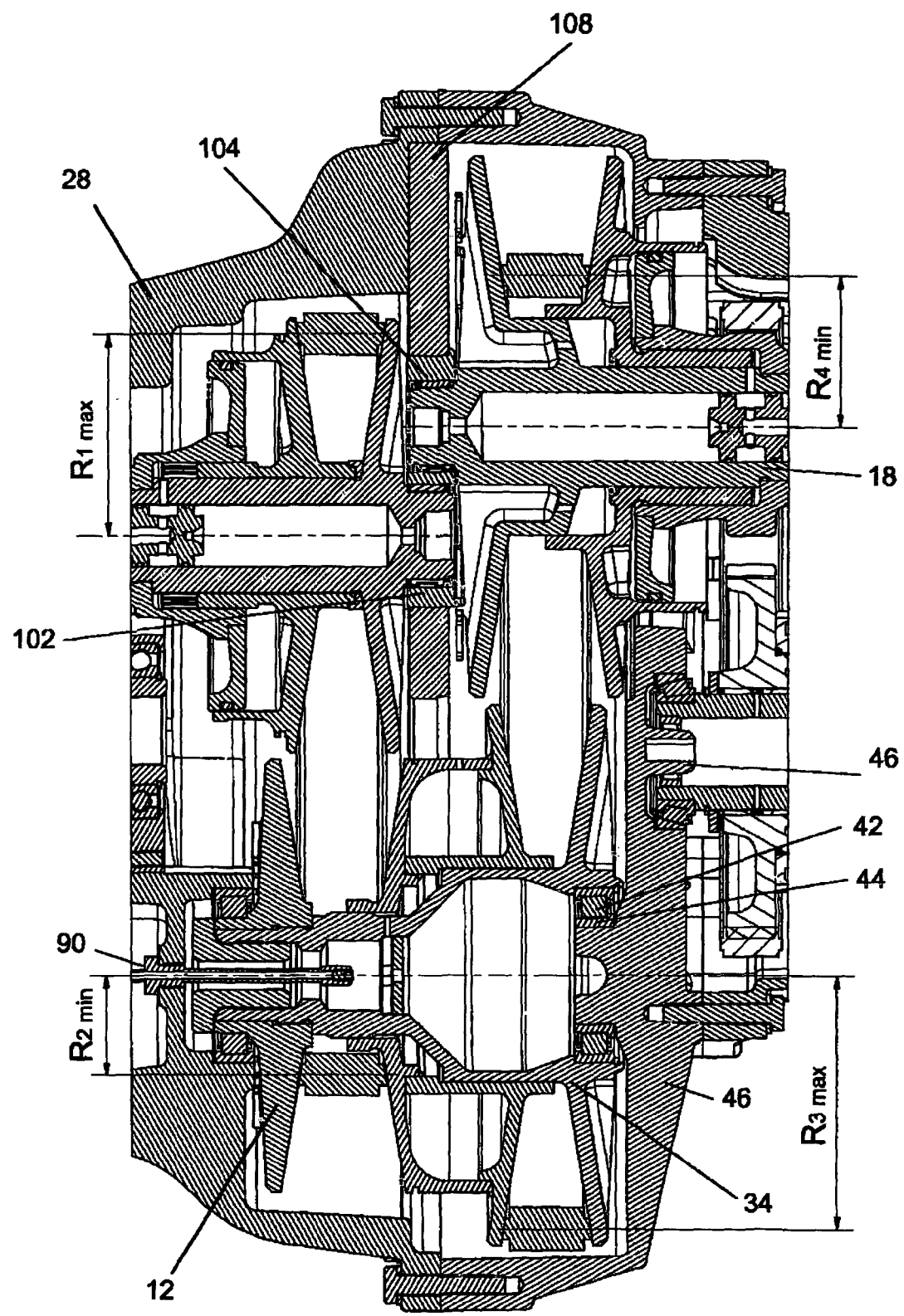
Figure 4:
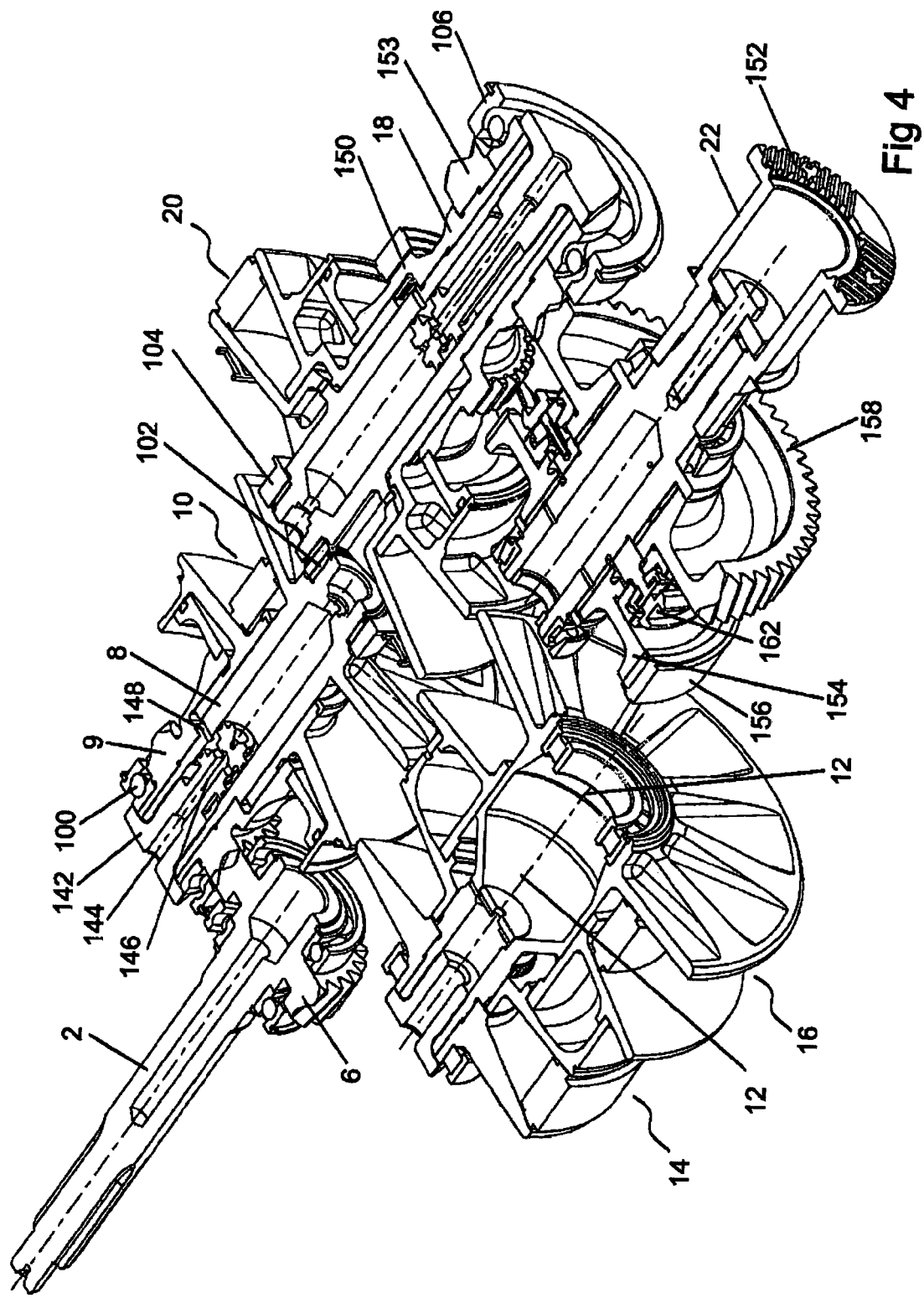
Figure 5:
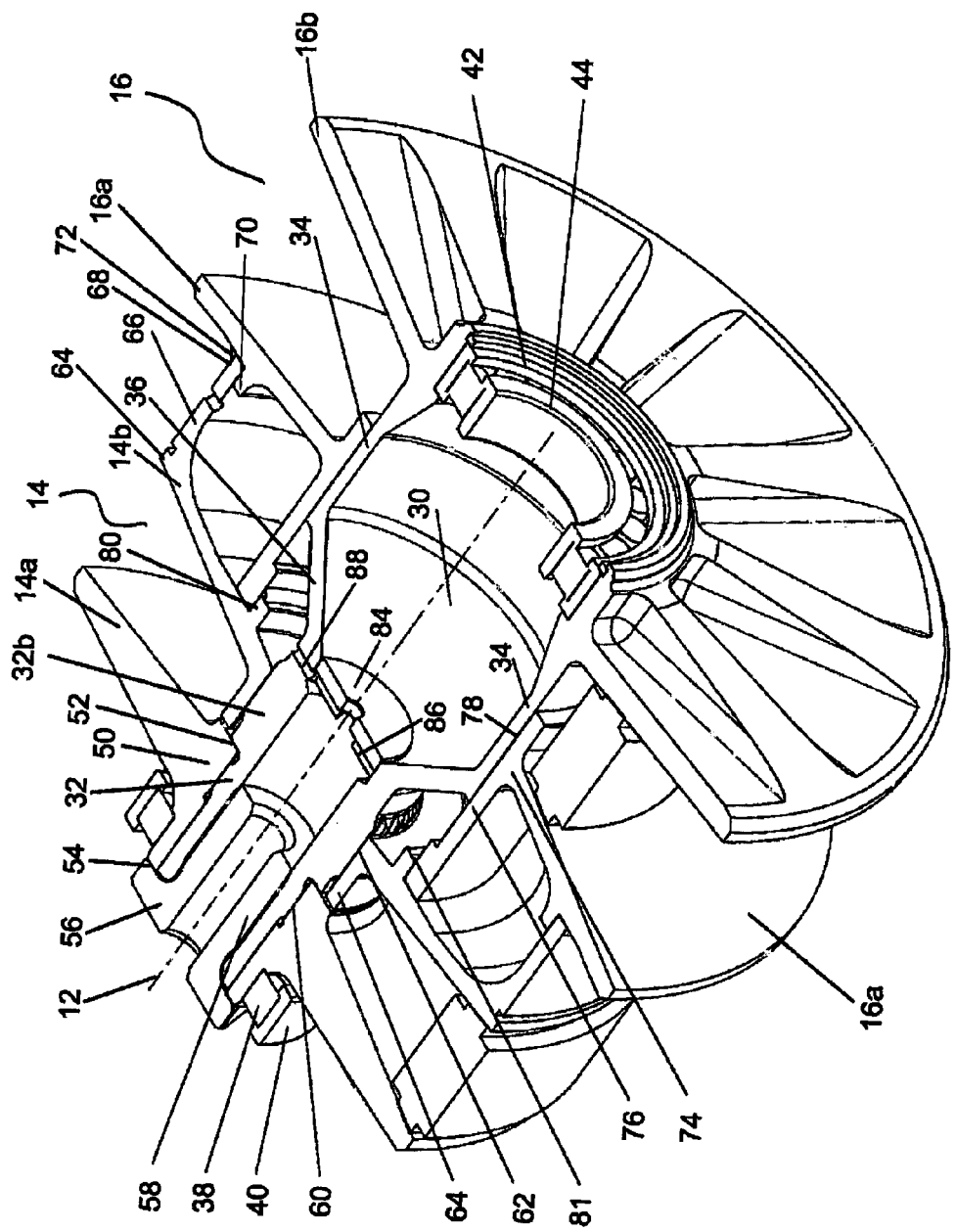
Figure 6:
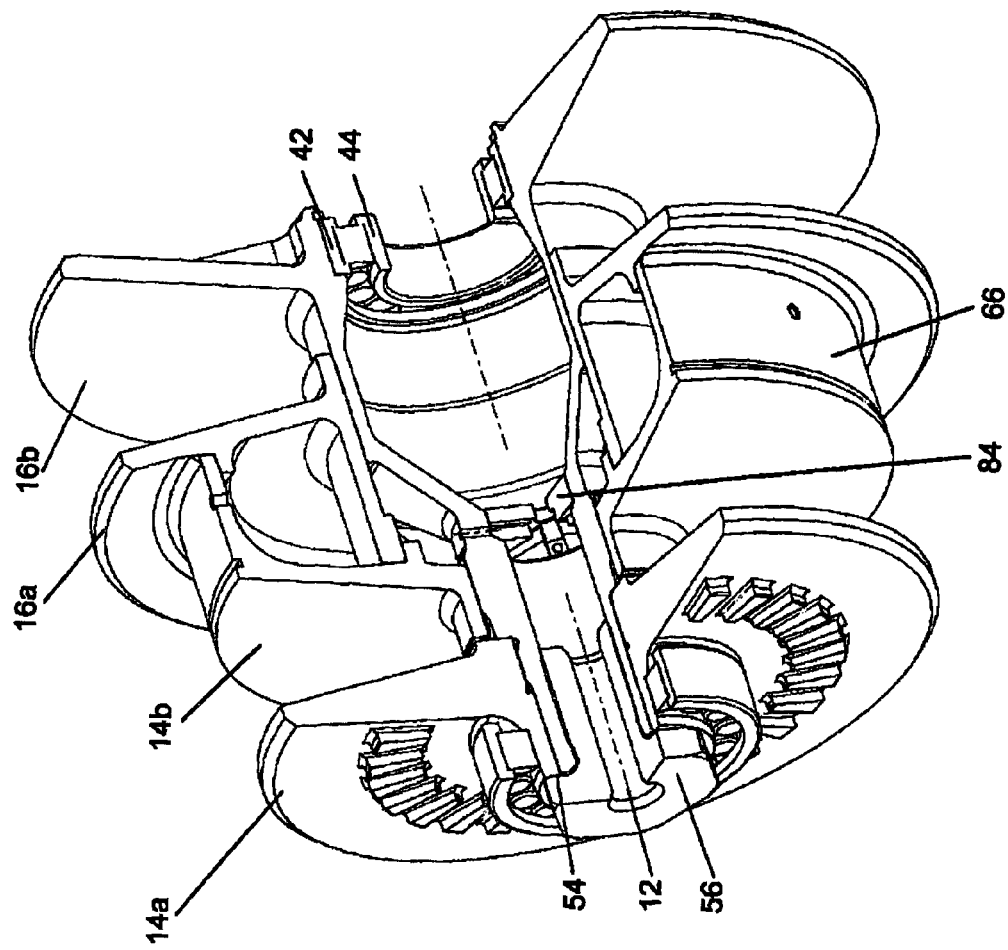
Figure 7:
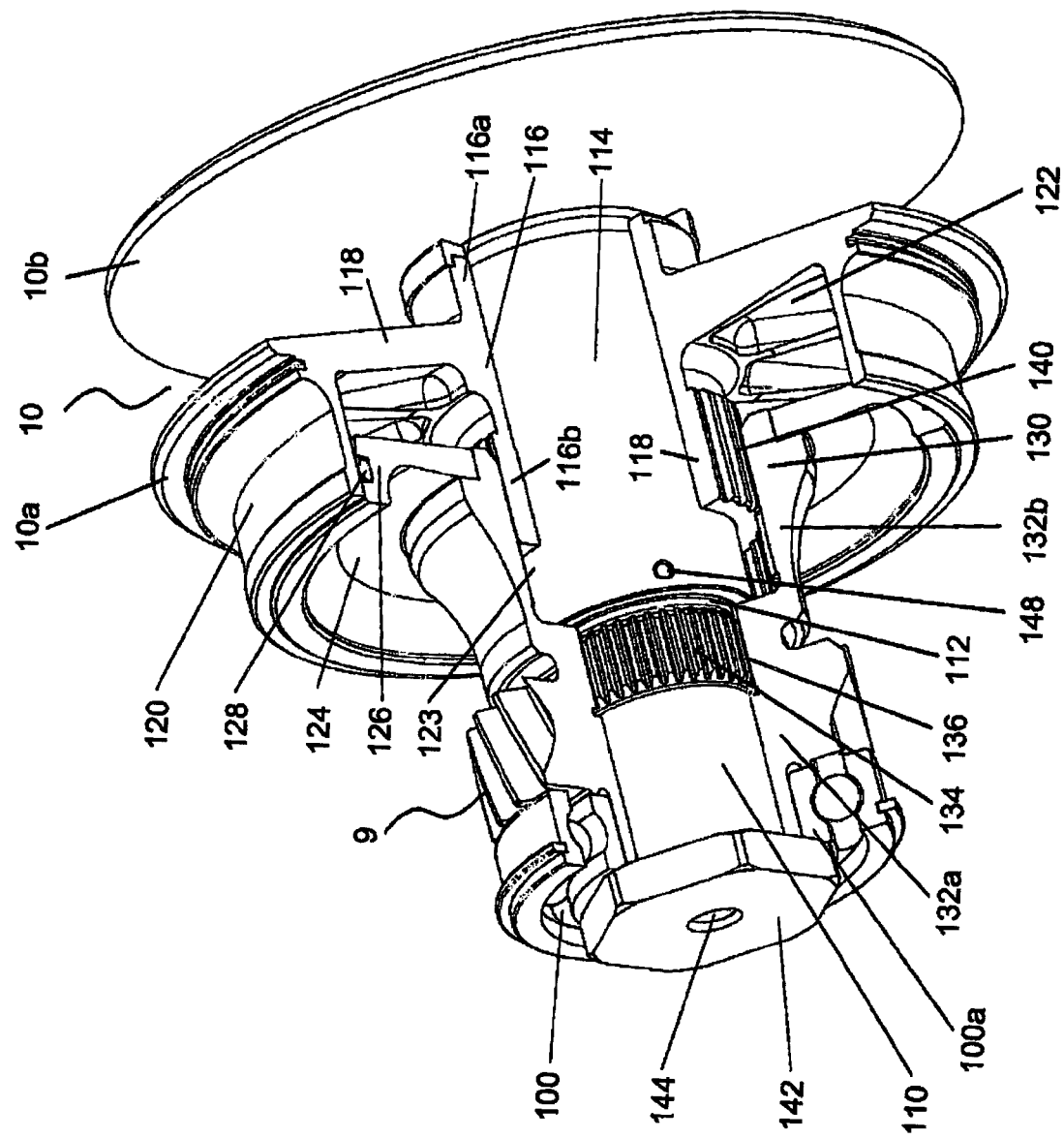

The invention will be elucidated on the hand of the drawing. In the drawing shows:

FIG. 1 a perspective view of the main components of the serial variable transmission (hereinafter to be called CVT), to be used in a vehicle and in which the invention is put into effect;

FIG. 2 a longitudinal cross-section of such a CVT;

FIG. 3*a* a longitudinal cross-section on a larger scale of that part of FIG. 2 in which the elements, of importance for the invention, are shown and in which the CVT is in the one extreme state in which the speed of the output shaft is reduced maximally with respect to the speed of the input shaft; this state is commonly indicated as "Underdrive" or "Low";

FIG. 3*b* a view similar to the one according to FIG. 3*a* but now with the CVT in the other extreme state in which the speed of the output shaft is increased maximally; this state is commonly indicated as "Overdrive" of "High";

FIG. 4 a perspective cut-away drawing of a complete CVT such as is subject of the invention;

FIG. 5 a perspective cut-away drawing of the components of the intermediate or countershaft of this CVT, this on an enlarged scale;

FIG. 6 a perspective view similar to the one according to FIG. 5 but now as seen under another viewing angle;

FIG. 7 a perspective view, partly cut away, of the input shaft of this CVT.

In the drawings the CVT is as a whole denoted with reference numeral 2. This transmission has, when used as a vehicle transmission, the following shafts:

1) A driving shaft 2, for instance coupled to the usual clutch of an engine. This shaft carries at the end 4 thereof a gear wheel 6.

2) An input transmission shaft 8 which carries a gear wheel 9, meshing with the gear wheel 6, and carrying a first set of pulley sheaves 10.

3) An intermediate of countershaft 12 which carries the second set of pulley sheaves 14 as well as a third set of pulley sheaves 16, in which the movable sheaves of these pulley sheave sets are combined into one single assembly, axially shiftable over said shaft 12.

4) A fourth shaft 18 which constitutes the output shaft of the transmission and which carries a fourth pulley sheave set 20. This shaft 18 is in a way to be described later coupled with a fifth shaft 22, which can, for instance, be the output shaft of the vehicle transmission and is in that case coupled to the (not shown) final drive thereof.

The first pulley sheave set 10 and the second pulley sheave set 14 are in way, known in itself, rotatingly coupled to each other by means of an endless transmission chain 24 while the third pulley sheave set 16 and the fourth pulley sheave set 20 are rotatably coupled with each other by means of a second endless transmission chain 26. The transmission chains can, for instance, be made by the endless drive chains of the kind as described in EP 071255.

Such a serial transmission which in fact is constituted by two individual CVT stages, coupled in series, in which the output pulley sheave set of the first CVT is directly coupled to the input pulley sheave set of the second CVT is, as described in the introduction, known in itself from the prior art.

The various shafts of the transmission according to the invention must, of course, be supported in suitable bearings. It will be clear that the fixed components of the respective bearings will be taken up and supported in resp. by the housing of the transmission. This housing is in its whole shown in FIG. 2 and indicated with reference numeral 28; part of this housing is also shown in FIG. 3a and FIG. 3b. The expert will quite easily get an idea about how it is to be realized in practice.

As indicated in the introduction to the Specification and elucidated therein the invention proposes that the diameters of the pulley sheaves of the first pulley sheave set 10 and the second pulley sheave set 14—which constitute in combination the first stage of the serial CVT are smaller than the diameter of the third pulley sheave set 16 and the fourth pulley sheave set 20 respectively which constitute in combination the second stage of the serial CVT, this in such a way that the effective running radius of the driving belt 26, which runs over these pulley sheave sets 16 and 20, can be greater than the effective running radius of the driving belt 24 which rotatingly intercouples the pulley sheaves of the first stage, this of the first pulley sheave set 10, and of the second pulley sheave set 14. The advantages of such a configuration, which is clearly visible in the drawing, are stated in the introduction to the specification.

In this specific embodiment the diameter of the sheaves of the third and fourth set are about 20% greater than same of the sheaves of the first and the second set.

The drawings show an embodiment in which the included angles of the respective pulley sheave sets are all mutually equal. As a result during the "switching" of the transmission the radial displacement of the driving belt on the second pulley sheave set will be equal, but opposite, the radial displacement of the driving belt which goes over the third pulley sheave set so that the ratio range of these two CVT stages will be equal.

When, however, the included angles of the pulley sheave sets of the first stage differ from same in the second stage the driving belts in the first stage displace during the "switching" over another distance than the driving belts in the second stage and thus it becomes possible that the respective ratio ranges of the stages are mutually different—thus, for instance, the ratio range of the second CVT set can be greater than same of the first CVT stage. A higher overdrive can be achieved by making the included angle of the sheaves of the second set smaller than same of the sheaves of the first set. This measure results furthermore in lower necessary clamping forces in this second CVT stage so that these clamping forces are better in balance with the forces necessary to be used in the first stage.

The intermediate or countershaft assembly of a serial CVT in combination with the second and third set of pulley sheaves must meet high requirements. Its mass must be low so that the responding time of the CVT will be as short as possible but the whole must yet be able to take up the very high one-sided forces which are exerted in a direction crosswise to the axis thereof. The preferred embodiment of this countershaft assembly as proposed by the invention meets these requirements and combines this with a low total weight of the transmission.

The main component of the intermediate shaft assembly 12 is a hollow, cylindrical, carrier as a whole indicated with reference numeral 30 in FIG. 5. It which comprises a first elongate hollow cylindrical part 32, a second hollow cylindrical part 34 with increased diameter and therebetween a diverging part 26. The first part 32 carries the second pulley sheave set 14 with the outer pulley sheave 14a and the inner pulley sheave 14b; the second cylindrical part 34 carries the third pulley sheave set 16 with the inner pulley sheave 16a and the outer pulley sheave 16b. The outer pulley sheave 14a is, as will be described later on, fixed and non-shiftably coupled with the cylindrical part 32 while the outer pulley sheave 13b is fixed and non-shiftably coupled with the end of the cylindrical part 34; both the inner pulley sheaves 14b and 16a are intercoupled and they can shift together in combination in axial direction. The inner pulley sheave 14b is supported on the cylindrical part 32 and the inner pulley sheave 16a is supported by the cylindrical part 34. The left-hand end of the cylindrical part 32 is supported in an outer bearing 38 of which the outer ring 40 is supported in a suitable way by the transmission housing 28; the right-hand end of the cylindrical part 34 surrounds the inner bearing 42 of which the stationary part 44 is supported in the transmission housing 28 in that the end flange 46 thereof (vide FIGS. 3a and 3b) comprises an inwardly protruding cylindrical stump 48 which fits within the stationary inner ring 44 of the bearing 42.

The figures show a preferred embodiment in which the first cylindrical part 32, the diverging in-between part 36 connected thereto, the second cylindrical part 34 and the outer pulley sheave 16b are made in one piece. The foot 50 of the outer pulley sheave 14a is enclosed between an upstanding rim 52 of the first cylindrical part 32 and the upstanding rim 54 of a retaining screw 56 of which the body 58 is screwed in the inner bore of the cylindrical part 32. A suitable spline connection, schematically indicated with reference numeral 60, ensures that the outer pulley sheave 14a rotates together with the intermediate shaft assembly 12. The embodiment in one piece ensures that the outer pulley sheave 16b is also rotatingly fixed to this assembly.

Of course both the inner pulley sheaves: 14b and 16a respectively must rotate together with the intermediate shaft assembly although it is still necessary that they can move freely in axial direction with as little friction as possible. This coupling is brought about by means of a schematically indicated spline connection 62 which is present between the right-hand end 32b of the cylindrical part 32 on the one hand and the axially directed foot 64 at the inner end of the inner pulley sheave 14b.

The inner pulley sheave 14b is fixedly connected to the inner pulley sheave 16a in that the radially outer upper end 64 thereof is prolonged by a sleeve-shaped edge 66 of which the end 68 is fixedly connected to the outer wall of the inner pulley sheave 16a. This is brought about in that this outer wall carries a inwardly directed edge 70 to which the end edge 68 is connected by means of a weld connection 72. The inner pulley sheave 16a has the foot 74 with a cylindrically sleeve-shaped configuration 76 of which the inner surface 78 rests upon the outer surface of the second cylindrical part 34 while this foot 76 is prolonged to the axially protruding end edge 80 of the inner sheave 14b and is connected at that position by welding (81) to this inner sheave 14b.

The hereinbefore described structure is simple and lightweight and carries the combination of the second and third pulley sheaves in such a way that the very large forces exerted thereon and directed crosswise to the axis thereof can easily be taken up in such a way that the axially displaceable pulley sheaves 14b and 16a respectively can execute their axial movement without having to overcome a significant friction. As a result changes in the transmission ratio of the two CVT sections can be brought about practically momentarily.

Although the moving parts of the third shaft assembly only execute axial movements it is yet of importance that they are adequately lubricated. As shown in FIGS. 5 and 6 the inner bore of the cylindrical part 32 is closed with a disc 84 of which the body comprises radial channels 86. These channels connect with channels 88 in the foot of the connecting part 36. By means of a centrally located oil supply tube 90 (shown in FIG. 3) lubricant can be supplied to the space between the end of the retaining screw 56 and the disc 84 which lubricant can, during operation, reach, under the influence of the centrifugal force via the channels 86 and 88 the axially moveable surfaces of the two inner pulley sheaves 14b, 16a on the one hand and the cylindrical parts 32 and 34 respectively on the other hand.

The FIGS. 3a and 3b show cross-sections of the transmission according to the invention in, on the one hand, the "Underdrive" of "Low" state and on the other hand the "Overdrive" or "High" state. In the figures the following reference numerals are used:

R1 indicates the running radius of the first driving belt 24 on the first pulley sheave set 10;

R2 indicates the running radius of first driving belt 24 on the second pulley sheave set 14;

R3 indicates the running radius of the second driving belt 26 on the third pulley sheave set 16;

R4 indicates the running radius of the second driving belt 26 on the fourth pulley sheave set 20.

With the additions "min" and "max" respectively are indicated the minimum respectively maximum values of these quantities.

The figures clearly show that—as already indicated hereinbefore—the effective running radius of the driving belt 26 which goes on the third and fourth pulley sheaves (16 and 20 respectively) is always greater than the effective running radius of the driving belt 24 on the respectively diagonally opposite sheaves of the first (10) and the second (14) set: in the first situation R4max is greater than R2max and R3min is greater than R1min while in the second situation R4min is greater than R2min and R3max is greater than R1max.

The input shaft of the serial CVT according to the invention is supported in two bearings, in FIG. 4 indicated with reference numerals 100 and 102 respectively and the output shaft 18 of the transmission is also supported in two bearings, on the one hand the bearing 104 and the other hand the bearing 106. The outer bearings 100 and 106 respectively are in a suitable way supported by the housing of the transmission. The way in which the bearings 102 and 104 are supported is, however, a special subject of the present invention.

As the FIGS. 3a, 3b and 4 show in the shown transmission these bearings do not lie opposite each other (as this is the case in the prior art) but, as a result of the fact that the pulley sheaves of the second stage are greater than same of the first stage, next to each other. They are according to the invention accommodated in a special flat box-shaped structure 108 (shown in the FIGS. 3a and 3b) which can be a solid plate but which can also be an open supporting structure with spaces to accommodate the bearings 102 and 104 respectively. The figures show an embodiment in which these bearings comprise rings of bearing needles which bear on the one hand directly on the shafts and on the other hand on the material of the structure 108 itself but each other suitable configuration can be used. The expert will have no problem in finding a suitable solution.

More particularly referring to the FIGS. 4 and 7 in the following a preferred embodiment of the structure of the input shaft 8 of the transmission according to the invention will be elucidated.

The shaft 8 has a very specific configuration with a first shaft part 110 which merges via a stepwise transition into a second shaft part 114 with increased diameter which at the right-hand end merges into the fixed pulley sheave 10b of the first pulley sheave set 10. The second pulley sheave 10a of this pulley sheave set 10 is connected to a shifting sleeve 116 which, shiftable in axial direction, closely surrounds the second shaft part 114. This shifting sleeve 116 carries a radially directed ring shaped and conical disc 118 which carries at its radial outer end an axial sleeve part 120; the inner surface thereof constitutes a first wall part of the pressure chamber 122 for the adjustable sheave 10a.

A second wall part of this chamber is constituted by the outer wall of the upstanding disc 118 while a third wall part is constituted by the outer surface of the disc part 116.

Finally there is an upstanding disc 124 of which the enlarged end 126 comprises a chamber with therein a sealing ring 128 which co-operates with the inner surface of the sleeve part 120 and of which the inner surface constitutes the fourth—and last—wall part of the pressure chamber 122.

The disc 124 is fixed to the end of the sleeve-shaped coupling disc 130 which closely surrounds the first shaft part 110 with a first part 132a, and which part 132a carries the inner ring 100a of the bearing 100 and which is, next thereto, provided with a teeth ring 9. The shaft part 110 carries a spline 134 which co-operates with a similar spline 136 on the inner side of the part 132; one half of the input torque is via this spline transmitted to the sleeve-shaped coupling piece 130 and the other half thereof goes directly to the fixed pulley sheave 10b. Said one half of the input torque is transmitted via a second spline connection 140 of the coupling piece 130 to the sleeve 116b/116 and from there to the moveable pulley sheave 10a.

The second part 132b of the coupling piece 130 lies at a distance from the shaft part 114 so that here a second pressure chamber 123 is formed.

The inner bore of the first shaft part 110 is closed by the closing screw 142 which has a central opening 144 via which pressure medium (which also acts as a lubricant) is supplied to the central bore 146 and this medium reaches through the axial channels 148 the free space under the sleeve-shaped coupling piece 130 and from there it reaches via cut-outs (not shown) in the second spline connection the pressure chamber 128.

This screw 142 has two additional functions: it retains the bearing 100 and fixes also in axial direction the wall part 124 by means of the sleeve-shaped coupling piece 130. Possibly the sleeve-shaped coupling piece 130 and the wall part 124 are made in one piece.

The fourth shaft 18 which is the output shaft of the transmission has a similar structure which will not be discussed in detail.

Particularly FIGS. 1 and 4 show an embodiment of the CVT according to the invention which is to be used as a vehicle transmission. It has an output shaft which carries two gear wheels fixedly connected thereto, namely a first gear wheel 150 with straight teeth and a second gear wheel 152 which is preferably a bevel gear. The shaft 22 with the end flange 152 is the output shaft of the vehicle transmission and can be coupled in the known way, if wanted so while inverting the rotation direction, with the shaft 18. To this end the shaft 22 carries freely rotating thereon a first gear wheel 152 which is coupled via the chain 158 to the gear wheel 150—here there is no inversion of the direction of rotation. A second freely rotating gear wheel 158 meshes with the gear wheel 152 on the shaft 18—here there is an inversion of the direction of rotation. The shaft 22 is provided with splines 160 and a coupling ring 162, which co-operates with these splines 160 and is axially shiftable. In two fixed positions it couples coupled, dependent upon the axial position thereof, the output shaft 22 with either the gear 154 or the gear 158 so that the shaft 22 rotates in either a first direction or in an opposite direction. As already stated: this is known prior art and no subject of the invention.

The invention claimed is:

1. Serial continuously variable transmission comprising a housing which contains:
   an input shaft which carries, rotationally secured thereto, a first controllable pulley sheave set;
   an output shaft carrying rotationally secured thereto a fourth controllable pulley sheave set; and
   at a distance thereof a second and third pulley sheave set, rotating around a common axis and mutually rotationally secured, a first transmission chain around the first and second pulley sheave set, a second transmission chain around the third and fourth pulley sheave set, these chains each comprising a number of adjacent links intercoupled by pairs of rocker elements in which in each pair the ends of at least one rocker element can cooperate in a torque transmitting way with the pulley sheaves;
   wherein the respective outer pulley sheaves of the second and third pulley sheave set are axially fixed and the respective inner pulley sheave of the second and the third pulley sheave set are interconnected and combined into an assembly which is shiftable along and rotatable around the common axis; and
   wherein the respective diameters of the pulley sheaves of the third and fourth set of pulley sheaves are greater than the diameters of the sheaves of the first and the second pulley sheave set respectively, in such a way that independent of the position of the shiftable assembly the effective running radius of the transmission chain which goes around the third and fourth pulley sheaves can be greater than the effective running radius of the transmission chain which goes around the respective diagonally opposite sheaves of the first and second set of pulley sheaves respectively.

2. The transmission according to claim 1, wherein the diameter of the sheaves of the third and the fourth set to be 3060% greater than same of the sheaves of the first and the second set.

3. The transmission according to claim 1, wherein the included angle of the third and fourth set of pulley sheaves differs from same angle of the first and second set.

4. The transmission according to claim 3, wherein the first end of the cylindrical carrier is supported in the housing in an outer bearing and the second end of this carrier is supported in the housing by means of an inner bearing.

5. The transmission according to claim 1, wherein the assembly comprising the second and third pulley sheave set is carried in a way which allows for axial shifting on a freely rotatable mainly cylindrical carrier with a first end opposite the first pulley sheave set and a second end opposite the fourth pulley sheave set, the carrier comprising, as seen from the first end thereof, a first hollow cylindrical part which merges via a diverging part into a second hollow cylindrical part with an outer diameter greater than same of the first part and ending at the second end of the carrier;
   wherein the carrier supports fixedly at the first end thereof the outer pulley sheave of the second pulley sheave set and supports fixedly at the second end threreof the outer pulley sheave of the third pulley sheave set while the inner end edge of the inner pulley sheave of the second pulley sheave set rests by means of a cylindrical bearing sleeve which is directed to the first end of the carrier, and is moveable in axial direction, on the outer surface of this first cylindrical part, while the inner end edge of the inner pulley sheave of the third pulley sheave set rests by means of a cylindrical guiding sleeve, and axially moveable, on the outer surface of the second cylindrical part.

6. The transmission according to claim 5, wherein the radial outer edge of the inner pulley sheave of the second pulley sheave set is connected by means of an axial connecting part to the outer surface of the inner pulley sheave of the third pulley sheave set; and
   wherein the inner end edge of the inner pulley sheave of the third pulley sheave set is connected by means of an axial connecting part to the outer surface of the inner pulley sheave of the second pulley sheave set.

7. The transmission according to claim 6, wherein the respective connecting parts are a sleeve-shaped element.

8. The transmission according to claim 1, wherein the input shaft thereof comprises an elongate cylindrical shaft body provided with an axial bore and having a first end and a second end, the body being rotatingly supported at both these ends and carrying near the second end a first, fixed, pulley sheave which co-operates with a second pulley sheave which is shiftable along the shaft body and of which the outer surface constitutes a first radial wall part of a control pressure chamber;
   said wherein the shaft body including a first shaft part, starting from the first end and having a first diameter and, connecting thereto, a second shaft part with a second diameter, greater than same of the first part, which carries near the free end thereof the fixed pulley sheave of the first pulley sheave set, while a sleeve-shaped coupling piece closely surrounds with a first part the first shaft part, being rotationally secured thereto and surrounding at a distance with a second enlarged part the second shaft part, while the outer surface of the first part carries rotatingly driven means, the second part with its inner surface being fixed rotatingly secured to the outer surface of a shifting sleeve which, while being axially shiftable, closely surrounds the outer surface of the second shaft part and of which the outer surface carries the second, shiftable, pulley sheave while the second part of the coupling piece carries a radially protruding ring-shaped disc which lies opposite the outer surface of the second pulley sheave and constitutes a second radial wall part of the control pressure chamber.

9. The transmission according to claim 8, wherein the upper edge of the ring-shaped disc sealingly co-operates with the inner surface of a sleeve-shaped part which axially protrudes from the upper end edge of the second sheave, the inner surface constituting a third axial wall part of the control pressure chamber.

10. The transmission according to claim 8, wherein the rotationally secured coupling between the coupling piece and the shifting sleeve, and also same between the first shaft part and the coupling piece, is obtained by means of co-operating axial ribs and grooves.

11. The transmission according to claim 8, wherein the first part of the coupling piece carries between the first end of the shaft body and a driving element on the shaft body the inner ring of a ball or roller bearing to which abuts the head of a bolt which is screwed into the shaft body and is provided with a central bore, in such a way that the first part is pressed against the transition between the first and the second shaft part.

12. The transmission according to claim 1, wherein the opposite ends of the input shaft and output shaft respectively are supported in bearings lying next to each other in a central support in the housing.

13. The transmission according to claim 1, wherein the input transmission shaft is driven via a gear wheel thereon from a central engine or clutch shaft which is also provided with a gear wheel.

14. A serial continuously variable transmission comprising:
- an input shaft that carries a first controllable pulley sheave set;
- an output shaft that carriers a fourth controllable pulley sheave set;
- a second and third pulley sheave set, rotating around a common axis and mutually rotationally secured,
- a first transmission chain around the first and second pulley sheave set; and
- a second transmission chain around the third and fourth pulley sheave set;
- wherein the respective outer pulley sheaves of the second and third pulley sheave set are axially fixed and the respective inner pulley sheave of the second and the third pulley sheave set are interconnected and combined into an assembly which is shiftable along and rotatable around the common axis; and
- wherein the respective diameters of the pulley sheaves of the third and fourth set of pulley sheaves are greater than the diameters of the sheaves of the first and the second pulley sheave set respectively, in such a way that independent of the position of the shiftable assembly, the effective running radius of the second transmission chain can be greater than the effective running radius of the first transmission chain.

\* \* \* \* \*